United States Patent Office 3,205,037
Patented Sept. 7, 1965

3,205,037
PROCESS FOR THE PREPARATION OF A
CRYSTALLINE ZEOLITE
Philip K. Maher and Eugene J. Nealon, Baltimore, Md.,
assignors to W. R. Grace & Co., Clarksville, Md., a
corporation of Connecticut
No Drawing. Filed June 14, 1962, Ser. No. 202,389
3 Claims. (Cl. 23—112)

This is a process for the preparation of microselective adsorbents. In one specific aspect, it relates to a plant-scale process for preparing synthetic crystalline zeolites having an effective pore size of about four Angstrom units.

Microselective adsorbents of the zeolite group are crystalline metal alumino silicates with the three dimensional network structure of silica and alumina tetrahedra. The zeolite structure is characterized by a repeating three dimensional network of large alumino-silicate cages connected by small uniform openings or pores. After synthesis, these large cavities are filled with water which can be driven off by heat without collapsing the cage. When dehydrated, these cavities can re-adsorb large quantities of water or other vapors at low partial pressures. Due to the small uniform strictures or pore openings connecting the alumino-silicate cages, these zeolites exhibit the unique property of excluding larger molecules from the cavity and allowing smaller molecules to pass through and be adsorbed, thereby acting as microselective adsorbents of molecules according to their size and shape. It has been shown that adsorbents having an effective pore size of about 4 Angstrom units are of particular interest in adsorbing vapors of low molecular weight materials, such as water, ethane, ethylene, propylene and mixtures of the same with larger molecules and branched chained hydrocarbons.

In addition, these zeolites also exhibit the property of base exchange whereby one metal cation can be exchanged for another allowing controlled changes in the effective pore size.

We have discovered a process whereby a 4.0 Angstrom unit crystalline zeolite in a high degree of purity can be prepared in plant-scale proportions. This material will hereinafter be referred to as Z–12–Na zeolite (Na indicates that the metal associated with the alumina-silicate is sodium).

A laboratory process for preparing this same material is described in co-pending application Serial No. 158,895. However, it is pointed out therein, that plant-scale production of the 4.0 Angstrom unit material by the method therein described results in an impure product.

It further discloses that a pure product can be obtained by the inclusion of a low temperature aging step in the process. But, this step results in a product having a 4.5 Angstrom unit effective pore size when the process is scaled up to plant size.

Our new process makes it possible to prepare a pure Z–12–Na zeolite having an effective pore size of 4.0 Angstrom units in plant-scale proportions.

Briefly, the process consists of heating a slurry of calcined clay, gradually adding a hot solution of sodium hydroxide to the slurry, maintaining the slurry at an elevated temperature for a period of time sufficient to insure crystallization and finally, separating the resulting solids.

The process of our invention will be described using clay, which is a compound, not a mixture, and does not decompose into a mixture as the raw material; however, the process is operable using compositions represented as mixtures of the oxides, $Na_2O$, $Al_2O_3$, $SiO_2$ and $H_2O$.

The primary raw material for our clay process is kaolin, a commercially available clay. Closely related clays, such as halloysite, are also suitable as starting materials in our process. In order for the subsequent treatment with aqueous caustic to be successful, the clay must be first calcined properly. (The reason for this will be discussed in more detail infra.) Calcination should be carried out at about 500 to 700° C. for about 2 to 18 hours. While the exact time required for calcination is dependent on the nature of the clay and the temperature of calcination, 2 to 4 hours at 700° C. gives consistently satisfactory results with the kaolin used here. It cannot be too strongly emphasized that proper calcination is essential to the successful preparation of the Z–12–Na zeolite by the subsequent hydrothermal conversion step.

After the clay has been properly calcined, a slurry is prepared by mixing the clay with part of the water required for the process. The slurry is heated to between 80–110° C. but preferably about 100° C.

The next step, which involves treating the hot clay slurry with hot (above 70° C.) aqueous sodium hydroxide, is the key to our new process.

A solution of sodium hydroxide is prepared by dissolving NaOH in water. (The amount of water used is that which is required for the process less that which was used in preparing the clay slurry.) If this solution has been freshly prepared, its temperature will be about 80° C. If it is not at about that temperature, it should be heated to between 80–110° C.

The hot sodium hydroxide solution is then gradually added to the hot clay slurry over a period of several hours.

We have found that the order of addition is critical. If the intended finished ratio of reactants is approached from high soda, contamination by undesirable zeolites will result.

After the addition of sodium hydroxide to the clay is complete, the reaction mixture is maintained at an elevated temperature until Z–12–Na zeolite crystallizes.

The ratios of reactants for our process are set out below. Note that the ratios of sodium hydroxide are expressed in terms of sodium oxide which is the usual analytical method of reporting caustic soda.

We have found that the weight percent of sodium oxide in the sodium hydroxide solution should be from 5.5 to 13.5% and that the weight ratio of caustic solution to calcined kaolin should be from about 5.5 to 23. This corresponds to a weight ratio of 0.7 to 2.6 of calcined clay to sodium oxide, and a weight ratio of 7.5 to 25 of water to sodium oxide. The operable ranges and the preferred conditions for the process for preparing Z–12–Na zeolite from kaolin are set out below:

| Ingredients | Operable Range | Preferred Conditions |
|---|---|---|
| Percent $Na_2O$ in NaOH solution | 5.5–13.5 | 8.1 |
| NaOH solution/calcined kaolin | 5.5–23 | 8.0 |
| Calcined kaolin/$Na_2O$ | 0.7– 2.6 | 1.5 |
| Water/$Na_2O$ | 7.5–25 | 11.0 |

When other materials such as sodium silicate-alumina or sodium silicate-sodium aluminate are used as raw materials, the operable ranges expressed in terms of oxide weight ratios are:

| Ingredients | Operable Range | Preferred Conditions |
|---|---|---|
| $Na_2O/Al_2O_3$ | 0.84–3.1 | 1.83 |
| $SiO_2/Al_2O_3$ | 0.88–1.8 | 1.18 |
| $H_2O/Na_2O$ | 7.2 – 25 | 11.6 |

If the amount of sodium oxide present or the concentration of sodium hydroxide used is too low, the hydrothermal conversion will proceed slowly or will not go to completion. That is, unconverted clay will be present together with the zeolite formed. This is not as serious as when the amount of sodium oxide present or the concentration of sodium hydroxide used is too high. In the latter case, an undesirable zeolite will be formed. As will be discussed infra, the adsorbent prepared from such a contaminated zeolite would not have the specificity and hence the desired attributes of the pure adsorbent.

Two factors to consider in the hydrothermal conversion step are the closely related variables, time and temperature. The hydrothermal alteration step is operable at from 70° C. to about 120° C., but the most convenient alteration temperature of operation is near the boiling point of the solution or about 80 to 110° C. While the rate in the hydrothermal conversion step is dependent on the temperature used, undesirable zeolite species are formed at temperatures above the upper limit and operation near 100° C. is to be preferred. At reaction temperatures of 90 to 110° C., at least one hour's heating is required and six hours will be ample in essentially all situations. Although continued heating will not harm the product, the six-hour period represents a practical limitation because no further advantage is gained to offset the cost of additional heating. There do not appear to be side reactions at lower temperatures but the conversion to Z-12-Na zeolite proceeds at a very slow rate and thus is not practical. When a temperature of 70° C. is used, complete alteration of the clay to the desired Z-12-Na zeolite structure requires about 4 days. We feel that this hydrothermal alteration takes place at even lower temperatures but will require increasingly larger amounts of time for each incremental change in the temperature. In order not to have an unduly protracted period of time, we prefer to operate at 100° C.

The remaining steps of our process present no special difficulties. The crystalline zeolite is recovered from the reaction mixture by conventional means, i.e., filtration, decantation or centrifugation and is washed with water. The wet zeolite is activated or converted to the adsorbent form by driving off the water. Activation, thus, is accomplished by heating the zeolite at about 350° C. for a few hours. If desired, the wet Z-12-Na zeolite may be converted to the calcium zeolite (Z-12-Ca) by treating it with excess aqueous calcium chloride. Here the calcium ions exchange for the sodium ions and effective pore size of about 5 Angstrom units is obtained.

The synthetic crystalline zeolite, as obtained by our present process, has the approximate empirical formula $Na_2O \cdot Al_2O_3 \cdot 2SiO_2 \cdot nH_2O$ where $n$ is a small number (7.1 to 8).

There are other zeolites having such a gross empirical formula but the primary utility of the Z-12 zeolite lies in the regularity of the internal geometry of the crystal. The fundamental building block of any zeolite crystal is a tetrahedron of four oxygen atoms surrounded by a smaller silicon or aluminum ion. Each of these oxygen ions has two negative charges, each silicon ion has four positive charges and each aluminum ion has three positive charges. A silicon ion thus balances half of the eight charges of the four oxygens which surround it. Each oxygen still retains one negative charge enabling it to combine with another silicon or aluminum ion and extend the crystal lattice in all directions. The aluminum ion, however, with one less positive charge than the silicon ion can only satisfy three negative charges of the four oxygens which surround it. To complete a stable crystal structure, other positively charged ions must be present. A sodium or potassium ion, for example, can make up the charge deficit of one aluminum ion while the calcium ion can make up the deficit for two aluminum ions. While the structure of most crystals extends uniformly in all directions without leaving empty spaces, in zeolites the framework of silicon-oxygen and aluminum-oxygen tetrahedra is honeycombed with relatively large cavities whose shape and size are a function of the nature of the particular zeolite under consideration.

The Z-12-Na zeolite has cavities of large capacity but apertures of fixed and uniform size. The selectivity of the adsorbent produced by activation of the corresponding zeolite depends not on the volume of the cavities but on the size and uniformity of the apertures which connect them. Since the apertures of the microselective adsorbent made from the Z-12-Na zeolite are about 4.0 Angstrom units in diameter, one would expect that molecules having a diameter of greater than that could not enter the crystal. It has been found that water having a diameter of about 3 Angstrom units passes freely through the apertures but larger molecules such as benzene do not.

In order for an adsorbent to be highly selective, its refusal characteristics are as important as its adsorbent properties. That is, when it is desired to separate two species, one should be as strongly refused as the other is adsorbed for a truly efficient separation to result. The single most important factor governing selective separation is the presence of apertures in the adsorbent of uniform and controlled size. It is readily apparent that the presence of even a small number of apertures of differing size will destroy the selectivity of the adsorbent. When the details of our process are carefully carried out, there is obtained a crystalline zeolite (and corresponding adsorbents) having uniformly sized apertures of about 4.0 Angstrom units.

The same hydrothermal treatment that leads to Z-12-Na zeolite when calcined clay is used will give substantially no Z-12 zeolite when uncalcined clay is used. Prolonged treatment of uncalcined clay with caustic will yield chiefly an undesirable zeolite having extremely small apertures. Moreover, the presence of only 2 or 3% of such a contaminant in the adsorbent will decrease the rate of adsorption and hence the apparent selectivity of the resulting adsorbent. Thus, if the kaolin used in our process is not properly calcined, the highly unique separation properties of the finished adsorbent are impaired. This same zeolite contaminant is obtained (and with the same unfortunate result) when the concentration of sodium hydroxide or the ratio of sodium oxide to calcined kaolin used in the hydrothermal conversion is too high. Strict adherence to the conditions of my process is necessary in order to consistently achieve a satisfactory synthetic crystalline Z-12-Na zeolite.

The Z-12 zeolites can be identified by their common X-ray pattern. The presence of impurities can be readily detected at the same time by the appearance of foreign diffraction lines in the pattern. These impurities have their own unique patterns and the characteristic lines of the usual contaminants, such as undesirable zeolites or unconverted kaolin, can be readily identified. It can be seen that X-ray diffraction studies provide a powerful tool for evaluating processes for making synthetic zeolites and, thus, provide a method for systematically determining the effect of changes in process variables.

The Z-12-Na zeolite is distinguished from other Z-12 zeolites by the adsorption of different materials. The Z-12-Na product has an effective pore size of 4.0 Angstrom units. The various molecules are estimated to have the following molecular sizes in Angstroms:

| | |
|---|---|
| Water | 3.0 |
| Oxygen | 3.6 |
| Nitrogen | 3.8 |
| Methane | 4.0 |
| Normal pentane | 4.4 |
| Freon-22 ($CHClF_2$) | 4.0 |
| Freon-12 ($CCl_2F_2$) | 4.4 |

Since Z-12-Na zeolite has an effective pore size of 4.0 Angstrom units it effectively refuses both Freon 22 and Freon 12. Other Z-12 zeolites with larger pore sizes will adsorb these materials. The Z-12-Na zeolite can be distinguished from Z-12 zeolites with smaller pore sizes by the same property.

The adsorption properties of the materials were measured using the same type of apparatus used in the well known Brunauer-Emmett-Tell (B.E.T.) Volumetric Adsorption method. All samples are activated under vacuum at 450° C. for 18 hours prior to adsorption studies. All adsorptions were run at constant temperature and pressure and volume changes were recorded with time to measure the adsorption of properties of the zeolite.

The scope and utility of our invention is fully illustrated by the following examples.

Example I

A 225 pound batch of reactant mixture having the composition:

Metakaolin/$Na_2O$ _____ 1.56
$H_2O$/$Na_2O$ _____ 11.30 was prepared according to the following procedure:

About 25 pounds of metakaolin were calcined for two hours at 700° C. The calcined clay was then mixed, with agitation, with 120 pounds of water in a jacketed tank to form a slurry, which was then heated to about 100° C.

In another tank, 21.1 pounds of 76% $Na_2O$ sodium hydroxide was dissolved in 59 pounds of water. The temperature of the resulting solution was slightly above 80° C.

The sodium hydroxide solution at about 80° C. was then slowly added to the 100° C. clay slurry with agitation over a 2-hour period.

After the addition of the sodium hydroxide, the temperature of the reaction mix was maintained at about 100° C. for 2-4 hours until crystallization was complete.

The mixture was then cooled, filtered and washed with 50 pounds of water using conventional techniques. After drying, the product displayed the following X-ray diffraction lines typical of Z-12-Na zeolite:

| $d$-Value: | Relative intensity |
|---|---|
| 12.4 | 100 |
| 8.75 | 56 |
| 7.13 | 42 |
| 5.50 | 23 |
| 4.35 | 6 |
| 4.11 | 41 |
| 3.72 | 58 |
| 3.29 | 52 |
| 3.18 | 9.5 |
| 2.98 | 64 |
| 2.90 | 12 |
| 2.75 | 13 |
| 2.69 | 10.5 |
| 2.63 | 38 |

The adsorptive capacity for $H_2O$ at 10% relative humidity in a static system was 23.04 weight percent.

It can be seen from a review of X-ray and adsorption capacity data that 100% Z-12-Na zeolite was obtained as product.

Example II

Another successful preparation of Z-12-Na zeolite was made using 450 pounds of reactant mixture having the following composition:

Metakaolin/$Na_2O$ _____ 1.56
$H_2O$/$Na_2O$ _____ 11.30

Fifty pounds of metakaolin were calcined for 2 hours at 700° C. The calcined clay was added with agitation to 240 pounds of water in a jacketed tank to form a slurry and then heated to about 100° C.

In another tank, 42.2 pounds of 76% $Na_2O$ sodium hydroxide were dissolved in 118 pounds of water with a resulting solution temperature of about 80° C.

The aqueous sodium hydroxide solution at about 80° C. was then introduced gradually into the clay slurry at about 100° C. with agitation over a period of one and one-half hours.

After the addition period, the mixture was maintained at a temperature of about 100° C. for 2-4 hours to complete crystallization of the product.

After the crystallization was complete, the product was cooled, filtered, washed and dried using conventional techniques.

The X-ray diffraction pattern was the same as that described in Example I. The adsorptive capacity for $H_2O$ at 10% relative humidity in a static system was 22.94 weight percent.

Example III

This example demonstrates the effect of using uncalcined clay in the preparation of Z-12-Na. None of the desired product resulted. The weight ratios of sodium oxide, uncalcined clay, and water and the reaction conditions are tabulated below:

| Weight Ratios | | | Production Conditions | | X-ray Diffractions Pattern |
|---|---|---|---|---|---|
| $Na_2O$ | Clay | Water | Time, Hrs. | Temp., ° C. | |
| 1.1 | 1.0 | 13.6 | 4 | 100 | Mixture of Zeolite. |
| 0.84 | 1.0 | 15.1 | 4 | 100 | Do. |
| 0.84 | 1.0 | 15.1 | 4 | 100 | No Z-12 lines. |
| 2.2 | 1.0 | 7.9 | 4 | 100 | Do. |

It is apparent that properly calcined clay must be used in order to get Z-12-Na zeolite as product.

Example IV

This example serves to illustrate the result when the finished reactant ratio is approached from high soda.

A 225 pound batch of reactant mixture having the composition:

Metakaolin _____ 1.56
$H_2O$/$Na_2O$ _____ 11.30 was prepared according to the following procedure:

21.1 pounds of 76% $Na_2O$ sodium hydroxide were dissolved in 179 pounds of water with the resulting solution temperature being about 80° C. To this warm solution was added, over a 30 minute period with agitation, 25 pounds of metakaolin which had been previously calcined at 700° C. for 2 hours.

After the addition period, the reaction mixture was maintained at a temperature of about 100° C. for 2-4 hours until crystallization was complete. The mixture was then cooled, filtered, washed and dried using conventional methods. The dry product was tested for purity by X-ray and found to contain 90% Z-12-Na, the desired product, and 10% zeolite contaminant. The adsorptive capacity for $H_2O$ at 10% relative humidity in a static system was 19.45 weight percent.

It can be readily seen that this method is not adequate for production of a pure Z-12-Na crystalline zeolite.

We claim:

1. A process for preparing a zeolite composition having the approximate gross composition $$Na_2O \cdot Al_2O_3 \cdot 2SiO_2 \cdot nH_2O$$ 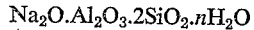

wherein $n$ is a small number and an effective pore size of 4.0 Angstrom units which comprises preparing an aqueous slurry of calcined kaolin clay, heating said slurry to a temperature of 80 to 110° C., adding an aqueous sodium hydroxide solution heated to about 80 to 110° C. to said slurry over a period of about 2 hours, the ratio of reactant in the final reactant mixture being 0.76 to 2.6 parts of calcined clay and 7.5 to 25 parts of water per part of sodium oxide in said sodium hydroxide solution, maintaining the reactant mixture so formed at a temperature between 80 and 110° C. until the zeolite crystallizes and finally, recovering the product.

2. A process for preparing a crystalline zeolite having the approximate gross composition $$Na_2O \cdot Al_2O_3 \cdot 2SiO_2 \cdot nH_2O$$

wherein $n$ is a small number and having an effective pore size of about 4.0 Angstrom units which comprises calcining kaolin clay at 500° C. for up to 18 hours to 700° C. for about 2 hours, forming an aqueous slurry of said calcined clay, heating said slurry to a temperature between 80–100° C. adding to said slurry an aqueous solution of sodium hydroxide at a temperature of 80 to 110° C. over a period of about 2 hours, the ratio of reactants in the final reactant mixture being 0.76 to 2.6 parts of calcined clay and 7.5 to 25 parts of water per part of sodium oxide in said sodium hydroxide solution, maintaining the reactant mixture so formed at a temperature between 80–110° C. until the zeolite crystallizes and finally, recovering the product.

3. A process for the preparation of a synthetic crystalline zeolite having the approximate gross composition $Na_2O \cdot Al_2O_3 \cdot 2SiO_2 \cdot nH_2O$, wherein $n$ is a small number and having an effective pore size of about 4.0 Angstrom units which comprises calcining kaolin clay at 500° C. for up to 18 hours to 700° C. for about 2 hours, preparing an aqueous slurry of said clay, heating said slurry to a temperature between 80–100° C., adding to said slurry over a period of about 2 hours a solution of sodium hydroxide at a temperature between 80–110° C., the ratio of reactant in the final reactant mixture being 0.76 to 2.6 parts of calcined clay and 7.5 to 25 parts of water per part of sodium oxide in said sodium hydroxide solution, maintaining said reactant mixture at a temperature of about 100° C. for at least one hour and finally, recovering the product.

References Cited by the Examiner

UNITED STATES PATENTS

| 2,544,695 | 3/51 | Kumins. | |
| 2,882,243 | 4/59 | Milton | 23—113 |
| 2,992,068 | 7/61 | Haden et al. | 23—112 |
| 3,114,603 | 12/63 | Howell | 23—113 |

FOREIGN PATENTS 594,512  8/60  Belgium.

OTHER REFERENCES

Kumins et al., "Ind. and Eng. Chem.," vol. 45, No. 3, 1953, pp. 567–72.

MAURICE A. BRINDISI, *Primary Examiner.*